United States Patent [19]
Hongo et al.

[11] Patent Number: 5,042,321
[45] Date of Patent: Aug. 27, 1991

[54] TRANSMISSION STRUCTURE FOR AN AUTOMOTIVE VEHICLE

[75] Inventors: Hitoshi Hongo; Hiroaki Deguchi; Nobuo Doi, all of Hiroshima; Yoshitsugu Hanada, Higashihiroshima, all of Japan

[73] Assignee: Mazda Motor Corporation, Hiroshima, Japan

[21] Appl. No.: 468,727

[22] Filed: Jan. 24, 1990

[30] Foreign Application Priority Data

Jan. 31, 1989 [JP] Japan .................................. 1-21580

[51] Int. Cl.⁵ ............................................ F16H 57/02
[52] U.S. Cl. ..................................... 74/606 R; 74/467
[58] Field of Search .................... 74/606 R, 607, 467, 74/730.1; 180/233

[56] References Cited

U.S. PATENT DOCUMENTS

| | | | |
|---|---|---|---|
| 4,601,359 | 7/1986 | Weismann et al. | 180/233 |
| 4,738,152 | 4/1988 | Takimura et al. | 74/467 |
| 4,745,986 | 5/1988 | Hanenberger | 74/606 R X |
| 4,823,637 | 4/1989 | Taguchi et al. | 74/606 R |
| 4,938,306 | 7/1990 | Sumiyoshi et al. | 74/467 |
| 4,952,200 | 8/1990 | Ohkawa | 74/730.1 X |

FOREIGN PATENT DOCUMENTS 3621620 1/1988 Fed. Rep. of Germany ...... 180/233
61-70543 4/1986 Japan .

Primary Examiner—Vinh T. Luong
Attorney, Agent, or Firm—Fleit, Jacobson, Cohn, Price, Holman & Stern

[57] ABSTRACT

A transmission structure for an automotive vehicle having a power unit includes an engine and a transmission device, including a power transmitting device connected to an output shaft of the engine, for transfer from an output of the engine to the transmission device. A first housing for the power transmitting device, a second housing for the transmission device, connected to the first housing, a differential device, housed in the first housing and positioned so as to be offset from an output shaft of the engine, and a reinforcement element, having one end portion connected to an upper surface of the first housing and another end portion connected to both side surfaces of the second housing, are provided.

6 Claims, 15 Drawing Sheets

TRANSMISSION STRUCTURE FOR AN AUTOMOTIVE VEHICLE

BACKGROUND OF THE INVENTION

1. Field of the Invention

The present invention relates to a transmission structure for an automotive vehicle, and, more particularly, to a transmission structure which prevents a power unit formed by an engine and a transmission, from shaking or vibrating.

2. Description of the Prior Art

Conventionally, it is well known to provide a front wheel drive vehicle or a four wheel drive vehicle with an engine having its crankshaft located in a transverse direction of the vehicle body. Such a vehicle has a power unit formed by an engine and a transmission case around the crankshaft. The transmission case is normally structured so as to include a clutch case, which accommodates a clutch and a gear case which accommodates a transmission gear assembly. A differential case, which accommodates differential gears, can be assembled integrally or separately with the clutch case. The differential case is typically disposed in front of the clutch case and parallel to the crankshaft of the engine. The transmission case is generally composed of a plurality of functional units.

In order to reduce shaking or vibration generated in the power unit, several technical innovations have been made. For example, Japanese Laid open Utility Model Application No. 61-70543 shows a reinforcing structure in which a corner portion, made in assembling the engine reinforces the transmission. According to this structure, although the engine and the transmission case can be firmly connected, shaking or vibration is not reduced by the reinforcing structure, since the transmission case is composed of a plurality of functional parts.

It has been found that an engine disposed in a transverse direction of the vehicle, with a differential case disposed in front of the engine and parallel to the crankshaft,
is subject to severe shaking or vibration in a transmission case, since the transmission case itself generates some vibrations such as bending vibration and torsional vibration. In particular, due to low stiffness, when the transmission case is divided into a plurality of parts, shaking or vibration will become worse.

On the other hand, a transmission case is structurally complex, and it is necessary to include on the transmission case some mounting elements so as to mount the case on a vehicle body. Also, the transmission case is required to be more compact to save space in a narrow engine compartment. Such makes it difficult to increase stiffness by adding new parts in the transmission case. Accordingly, it is strongly desired to establish a reinforced structure which is usable in a limited space by using smaller size reinforcement elements.

SUMMARY OF THE INVENTION

It is, therefore, an object of the present invention to provide a transmission structure which can suppress shaking or vibration, and which enables a power unit, as a whole, to reduce shaking or vibration. It is another object of the present invention to provide a transmission structure which has an optimal reinforcing structure, in a small space, by using which uses small reinforcing structure elements.

The above and other objects of the present invention are accomplished by providing a transmission structure for an automotive vehicle having a power unit including an engine and a transmission device. The transmission structure includes a power transmitting device, connected to an output shaft of the engine, for transfer from an output of the engine to the transmission device, a first housing for the power transmitting device, a second housing for the transmission device connected to the first housing, a differential device housed in the first housing and positioned so as to be offset from an output shaft of the engine, and a reinforcement element, having one end portion connected to an upper surface of the first housing, and the other end portion connected to both side surfaces of the second housing.

BRIEF DESCRIPTION OF THE DRAWINGS

The above and other objects and features of the present invention will become apparent from the following description of a preferred embodiments of the invention. Reference is made to the accompany drawings, in which.

DETAILED DESCRIPTION OF THE PREFERRED EMBODIMENTS

Figure 1:
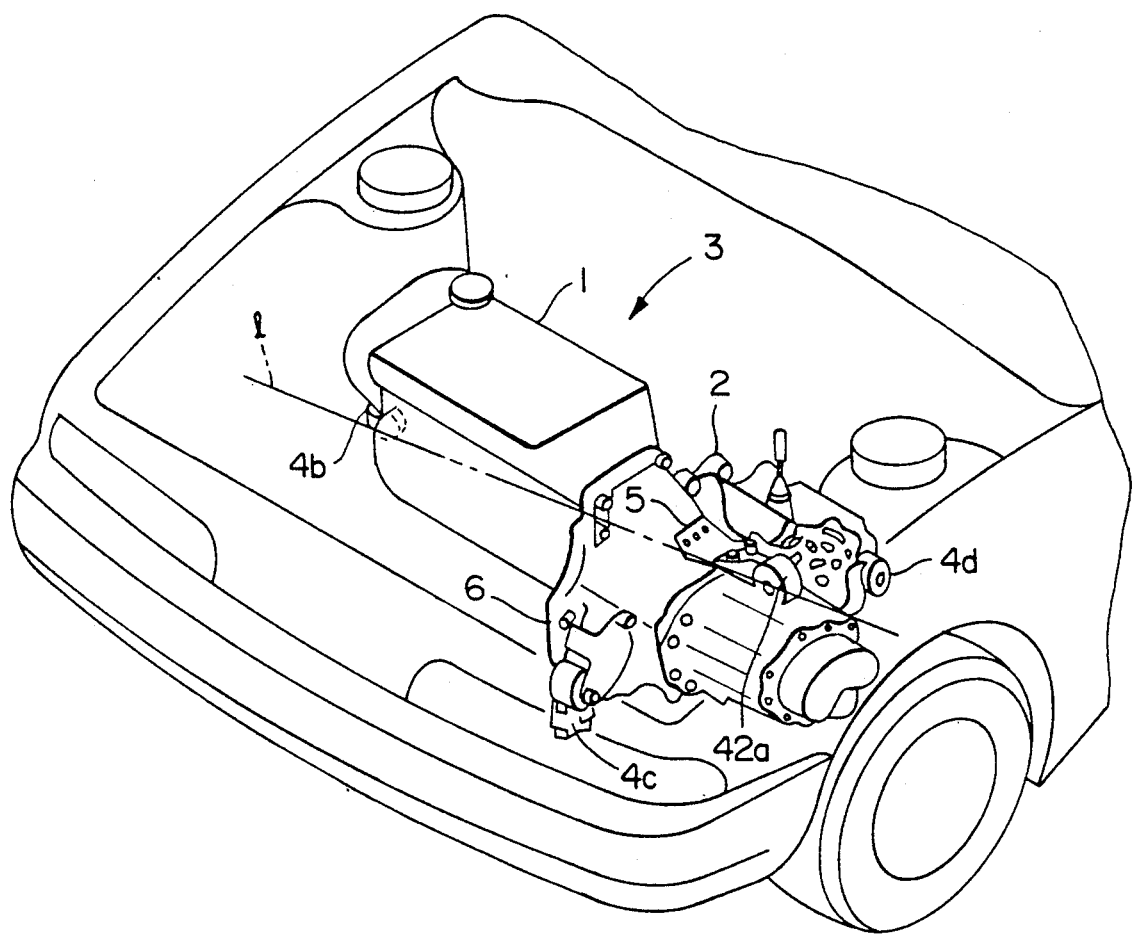
FIG. 1 is a perspective view, schematically showing a typical power unit system in accordance with one embodiment of the present invention employing a reinforcing structure.
Figure 2:
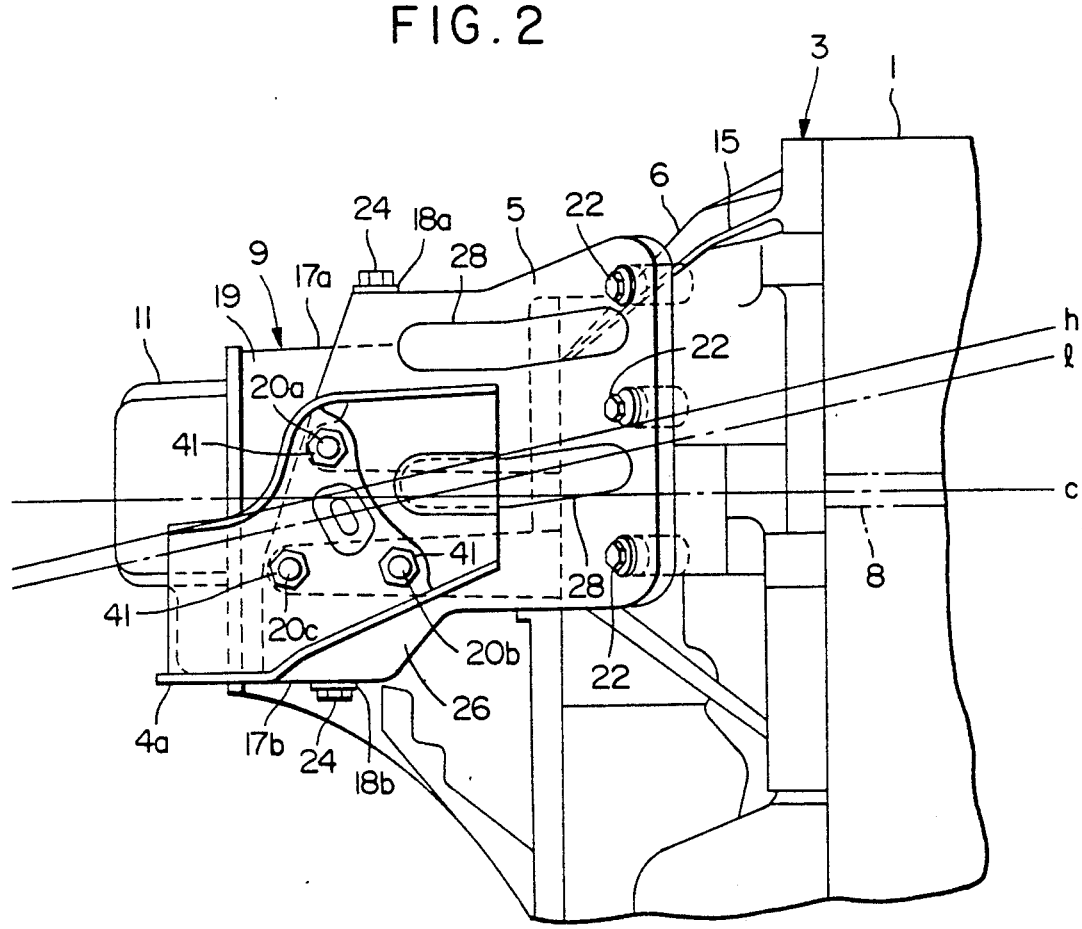
FIG. 2 is a plan view of the transmission case shown in FIG. 1.
Figure 2A:
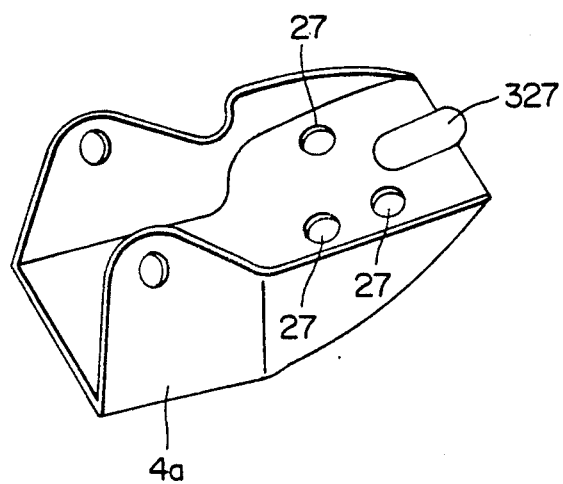
FIG. 2a is a perspective view of an engine mount shown in FIG. 2.
Figure 3:
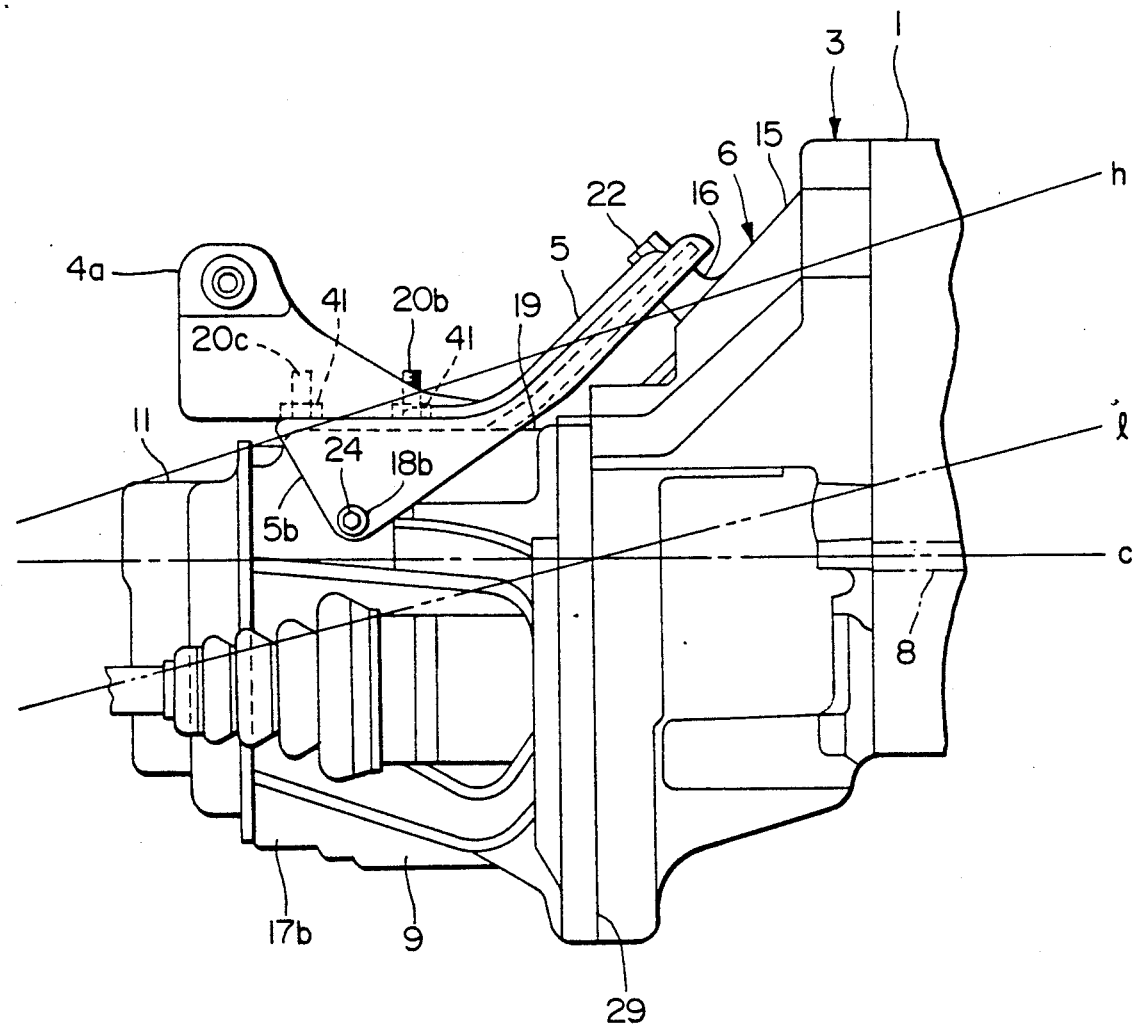
FIG. 3 is a side view of the transmission case shown in FIG. 1.
Figure 4:
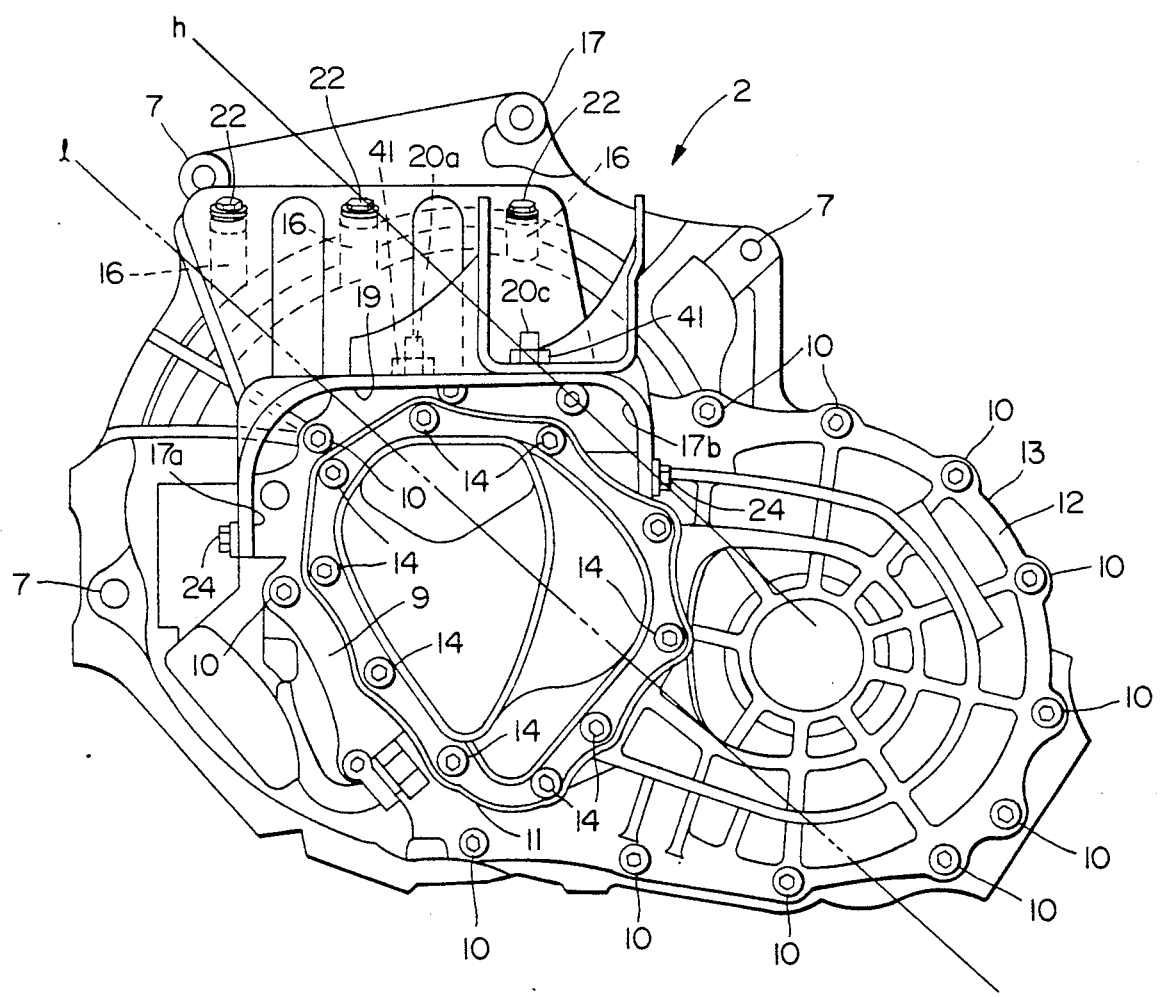
FIG. 4 is a front view of the transmission case shown in FIG. 1.
Figure 5:
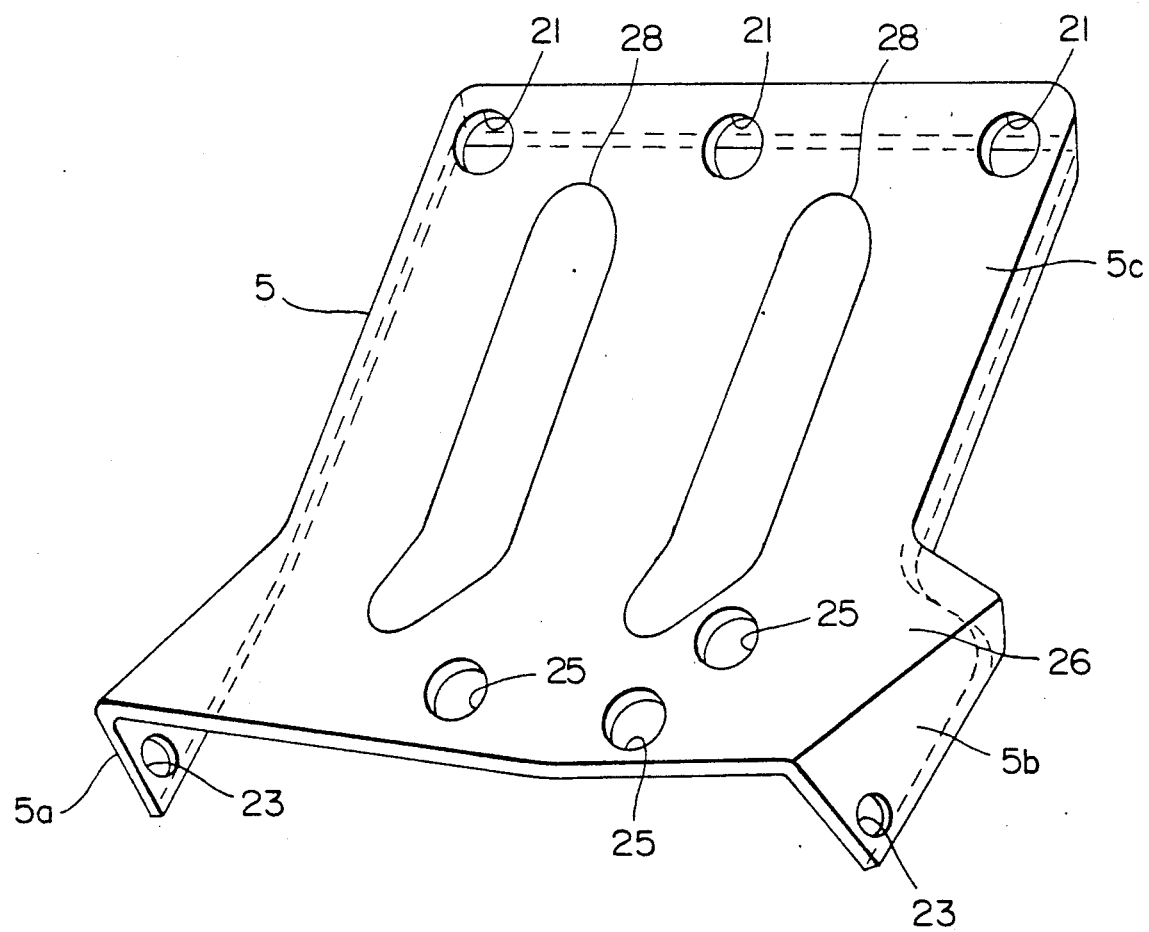
FIG. 5 is an enlarged view of a reinforcement in accordance with the embodiment shown in FIG. 1.
Figure 6:
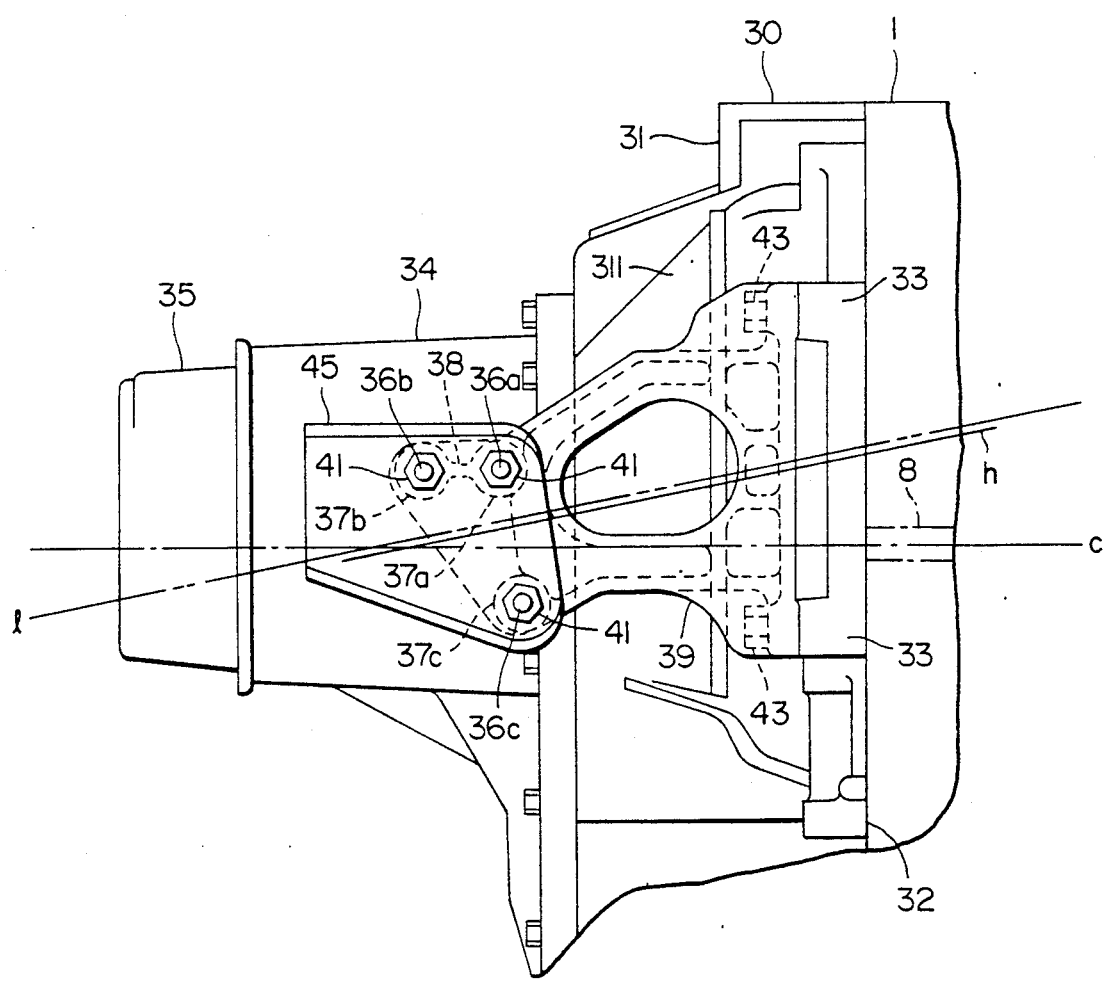
FIG. 6 is a plan view, showing a modified embodiment of the transmission case in accordance with the present invention.
Figure 7:
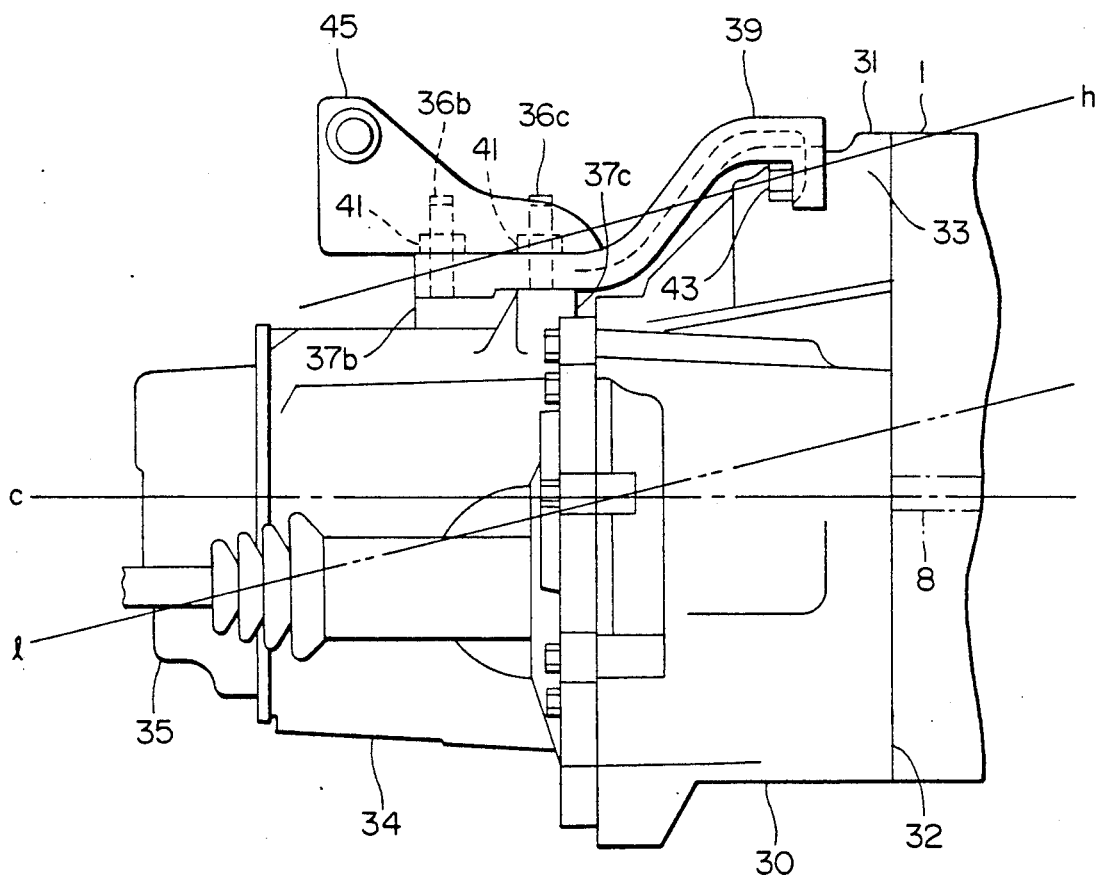
FIG. 7 is a side view of the transmission case shown in FIG. 6.
Figure 8:
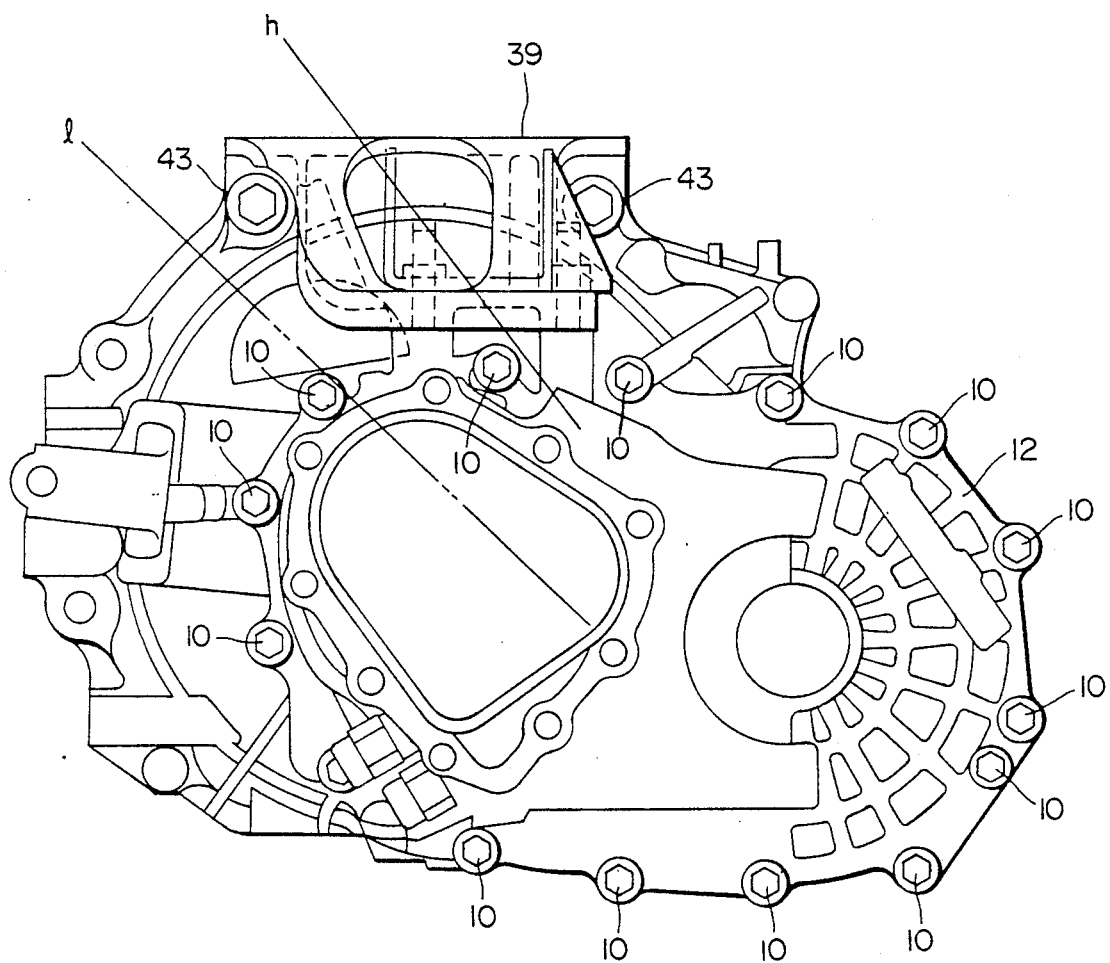
FIG. 8 is a front view of the transmission Case shown in FIG. 6.

1. First Embodiment of the Present Invention

Referring to FIGS. 1 to 5, an engine 1 is mounted such that the crankshaft of the engine is disposed in a transverse direction of the vehicle. A transmission case 2 is attached to one end of the engine 1. Hereinafter, the engine 1 and transmission case 2 are referred as "power unit 3" when they are assembled together. The power unit 3 is supported on a vehicle body by four supporting units or mounts 4a, 4b, 4c and 4d. A first mount 4a is disposed between the transmission case 2 and the vehicle body. A second mount 4b is disposed between the lower end of the cylinder block of the engine 1 and the vehicle body. The mounts 4a and 4b are disposed on the inertia axis l of the power unit 3.

A third mount 4c is disposed between the front end of the transmission case 2 and the vehicle body. A fourth mount 4d is disposed between the rear end of the transmission case 2 and vehicle body. The mount 4c is located of the inertia axis 1 of the power unit 3. The mount 4d is located rearward of the inertia axis 1 of the power unit 3. Therefore, the mounts 4c and 4d are located on opposite sides of the center of the gravity of the power unit 3.

The engine 1 is connected at one end by bolts 7 with a first housing formed by a clutch case 6, which accommodates a power transmitting device formed by clutch elements (not shown) for transferring an output from the engine to a transmission device. The clutch case 6 is fixed by bolts 10 to a second housing, formed by a gear case 9, which accommodates the transmission device, which is formed by gears (not shown). The gear case 9 is connected at one end with a transmission cover 11 by bolts (not shown). A differential housing or case 12 is integrally connected with the clutch case 6, rearwardly and downwardly of the crankshaft of the engine 1. The gear case 9 is connected integrally with a cover 13 which covers the differential case. The differential case 12 and the cover 13 are connected to each other, via a seal element (not shown), by a plurality of bolts 14.

The upper surface of the clutch case 6 gradually inclines toward the engine 1 so as to form an inclined plane 15. Three boss portions 16 for fixing bolts are formed perpendicularly on the inclined plate 15. On a front side surface 17a and a rear side surface 17b, holes 18a and 18b for receiving bolts are provided. On the gear case 9, there are provided three bolt portions 20a, 20b and 20c protruding upwardly from the upper surface of the gear case 9. A reinforcement member 5 is composed of a ceiling portion 5c which faces upper surfaces of the gear case 9 and the clutch case 6, and opposite side wall portions 5a and 5b which extend from ends of the ceiling portion 5c in a direction perpendicular to a plane including the ceiling portion 5c. The reinforcement element 5 has a U-shaped cross-section which is longer at a portion near the transmission and shorter at a portion near the engine 1.

A boss portion 16 of the clutch case 6 and an oval hole 21 in reinforcement elements are fitted together so that a bolt 22 can be threaded into the boss portion 16. The side wall portions 5a and 5b are abutted against the front and rear side surfaces 17a and 17b of the gear case 9. Therefore, the side wall portions 5a, 5b and the ceiling portion 5c cover the gear case 9. There are provided holes 23 on the side wall portions 5a and 5b, respectively. The side wall portions 5a and 5b are fitted to the gear case 9 so that the holes 23 formed on the side wall portions 5a and 5b can be aligned with bolt holes 18a and 18b so that bolts 24 can be threaded into the bolt holes 23.

On its end adjacent to the transmission, the ceiling portion 5c has three holes 25. When the reinforcement element 5 is installed, the reinforcement element 5 is fixed by inserting the bolt portions 20a, 20b and 20c into the holes 25. On the ceiling portion 5c, there is formed an extended portion 26, which is located near the transmission and protrudes toward the differential case 12.

When mounted, the extended portion 26 causes a central axis h of the reinforcement element 5, to be aligned, i.e., parallel with the inertia axis l of the power unit 3. Normally, if the axis h of the reinforcement element 5 is not parallel with the inertia axis l of the power unit 3, the reinforcement element 5 is loaded with a large amount of stress, which tends to cause the reinforcement element 5 to be released, or loosened from the power unit 3. The structural characteristics of this invention provided by the parallel relation between the central axis h of the reinforcement element 5 and the inertia axis l of the power unit 3 can contribute to avoiding the stresses applied on the reinforcement 5 effectively and, as a result, to reducing the size of the reinforcement element 5.

On the ceiling portion 5c, there are formed two thicker portions 28, extending along an axis c of an engine output shaft, or crankshaft, 8 between the oval holes 21. Thicker portion 28 protrude upwardly.

The mount 4a has three openings 27. The reinforcement element 5 and the mount 4a are fastened together by threading a nut 41 onto one end of each of the bolt portions 20a, 20b and 20c after inserting the bolt portions 20a, 20b and 20c into the openings 27 of the mount 4a. The mount 4a has a recessed lower surface 327 fitting to the thicker portions 28 to increase the contact surface area between the mount 4a and the reinforcement element 5.

Since the reinforcement element 5 is disposed so as to cover both side surfaces 17a, and 17b, and an upper surface 17c of the gear case 9, the stiffness against bending vibration, caused by movement of the vehicle in both an up-and-down direction and a right-and-left direction of the vehicle, is increased. Also, the stiffness against torsional vibration, caused mainly on a connecting surface 19 of the clutch case 6 and the gear case 9, is increased because the reinforcement element 5 grabs the gear case 9 by its side wall portions 5a and 5b.

Since the center axis h of the reinforcement element 5, extending in the direction of engine crankshaft 8, is parallel to the inertia axis l, vibration is suppressed.

The reinforcement element 5 can be constructed by molding or by welding steel plates. Also, the mount element and the reinforcement element can be integrally manufactured to simplify an assembly work on a vehicle assembly line.

2. Second Embodiment of the Present Invention

In the description of the second embodiment, some parts corresponding to those of the first embodiment are referred to by the same reference in numbers as in the first embodiment, and their explanations will be omitted hereinafter to avoid duplication.

Referring now to FIGS. 6 to 9, a first housing formed by a clutch case 31 has a top portion which is formed as an inclined surface 311, inclining downwardly as it departs from the engine 1. The clutch case 31 is connected with a second housing, formed by a gear case 34 at an end opposite to the engine 1. The gear case 34 has a transmission cover 35 which is connected with the gear case 34 at an end remote from the engine 1. Therefore, the clutch case 31, the gear case 34 and the transmission cover 35 form a transmission case 30.

On the inclined surface 311 and adjacent to a connecting surface 32, there are provided two bolt boss portions 33 with axes extending along the output shaft crankshaft 8 of the engine 1. On the upper surface of the gear case 34, there are formed three boss portions 37a, 37b and 37c, which have bolt portions 36a, 36b and 36c protruding upwardly, respectively. The boss portions 37a and 37b are disposed forward of a line C, extending parallel to the crankshaft 8. A linking portion 38 is formed between the boss portions 37a and 37b. The boss portion 37c is disposed rearwardly of line C as compared with the boss portions 37a and 37b.

A reinforcement element 39 is disposed between the clutch case 31 and the gear case 34 so that the reinforcement element 39 bridges the clutch and gear cases. The reinforcement element 39 is aligned with the bolt boss portions 33 on the clutch case 31 and the bolt portions 36a, 36b and 36c on the gear case 34.

The reinforcement element 39 has an end or edge portion 391 connected to the engine 1, a ceiling portion 392 and an end or edge portion 393 connected to the transmission. The edge portion 391 is bent downwardly and has bolt openings 42a, 42b of oval configuration with the longitudinal axis thereof extending in the up-and-down direction. A plurality of bolts 43 fix the reinforcement element 39 and the clutch case 31 to the engine 1.

The edge portion 393 has three bolt holes 393a, 393b and 393c which are fitted to the bolt portions 36a, 36b and 36c of the gear case 34, respectively. These bolt holes 393a, 393b and 393c have a smaller diameter than that of the boss portions 37a, 37b, 37c so that the reinforcement element 39 can be mounted on the boss portions 37a, 37b, 37c.

The ceiling portion 392 is composed of a leg portion 44a which connects the bolt opening 42a on the edge portion 391 and the bolt portion 36a on the gear case 34, and a leg portion 44b which connects the bolt opening 42b on the edge portion 391 and the bolt portion 36c on the gear case 34.

Figure 9:
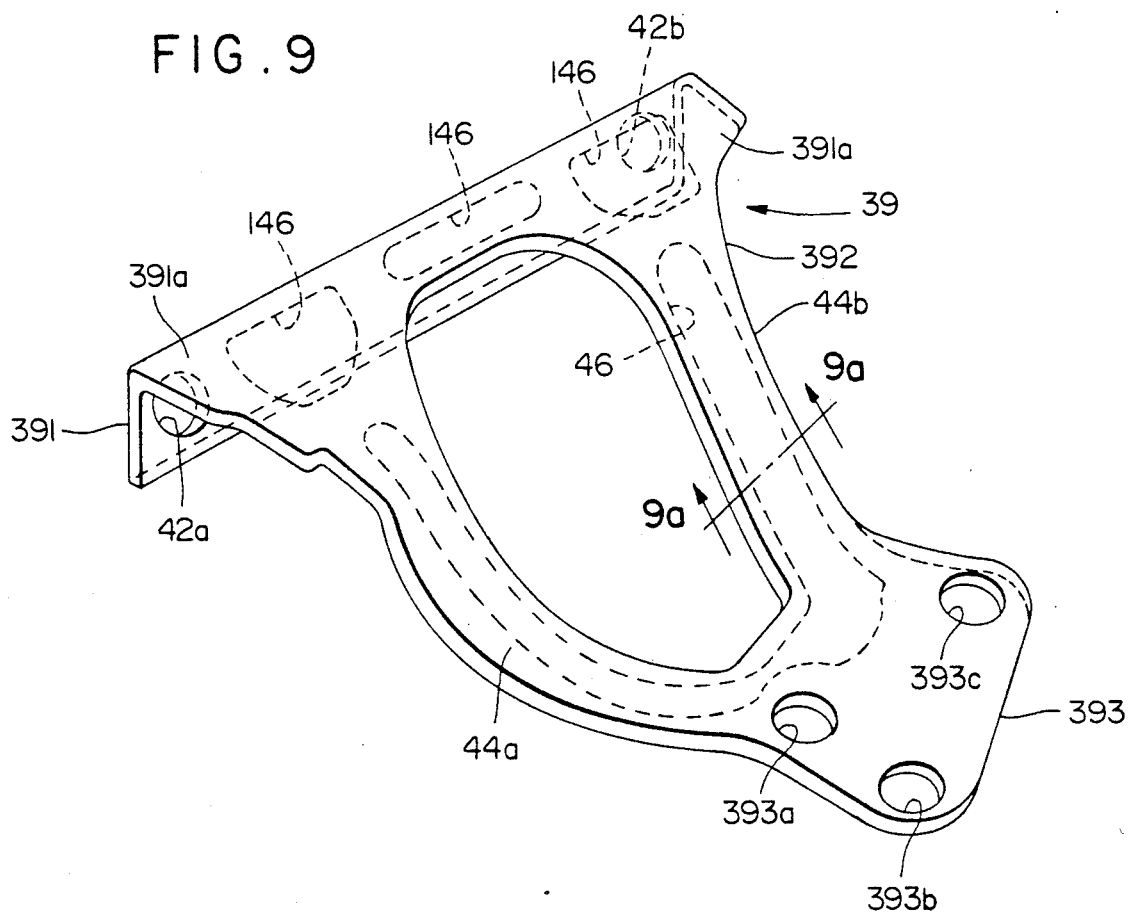
FIG. 9 is an enlarged view of a reinforcement in accordance with the embodiment shown in FIG. 6.
Figure 9A:
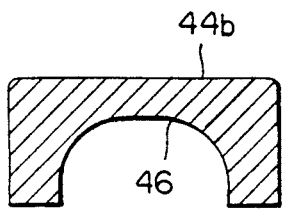
FIG. 9a is a cross-sectional view taken along line 9a—9a in FIG. 9.

An engine mount element 45 and the reinforcement element 39 are fastened together with the gear case 34 by threading a nut 41 onto bolt portions 36a, 36b and 36c. The distance between the bolt openings 42a and 42b is longer than that between the bolt holes 393b and 393c. The bolt opening 42a and 42b are designed to be located on opposite sides of the inertia axle 1 of the power unit 3. Also the bolt holes 393b and 393c are designed to be located on opposite sides of the inertia axle 1 of the power unit 3. Therefore, the edge portion 393 is offset rearwardly from crankshaft 8. The reinforcement element 39 has a lower surface which has a recessed configuration including recesses 46, having a U-shaped cross-section in a plane perpendicular to the crankshaft 8, as shown in FIG. 9a.

The bolts 43 fasten both the reinforcement element 39 and the clutch case 31 to the engine 1. Therefore, the reinforcement element 39 can suppress vibrations by being connecting with the engine 1. The edge portion 391 of the reinforcement element 39, has a protruding portion 391a, which extends widely along a plane of the ceiling portion 392. The protruding portion 391a is effective to increase the durability of a corner portion of the edge portion 391 against bending during vibration.

The reinforcement element 39 is fixed to the power unit 3 so that the reinforcement element 39 is bolted at both sides of the inertia axis 1; i.e. the axis of the gear case 34. Therefore, the stress on the fixing bolts becomes relatively small, and the reinforcement element 39 can be manufactured with a compact size. Moreover, since the width of the edge portion 393 is designed to be narrower than that of the edge portion 391, the stress on the bolts 43 can be effectively reduced. Furthermore, the reinforcement element 39 includes several recessed portions 146 so as not to jeopardize the reinforcing structure. That is, the recessed portions 146 are formed on portions which are not subject to severe vibration forces.

3. Experimental Comparison

Figure 13:
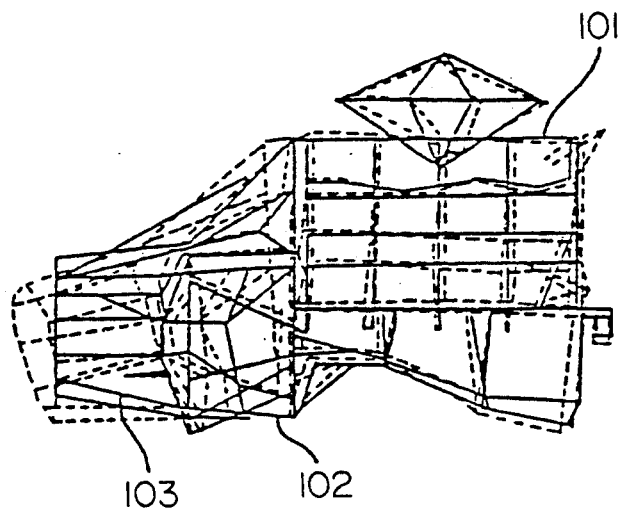
FIG. 13 is a graphic analysis of displacement states of a primary mode of vibration caused in a conventional power unit as it is seen in a plan view.
Figure 14:
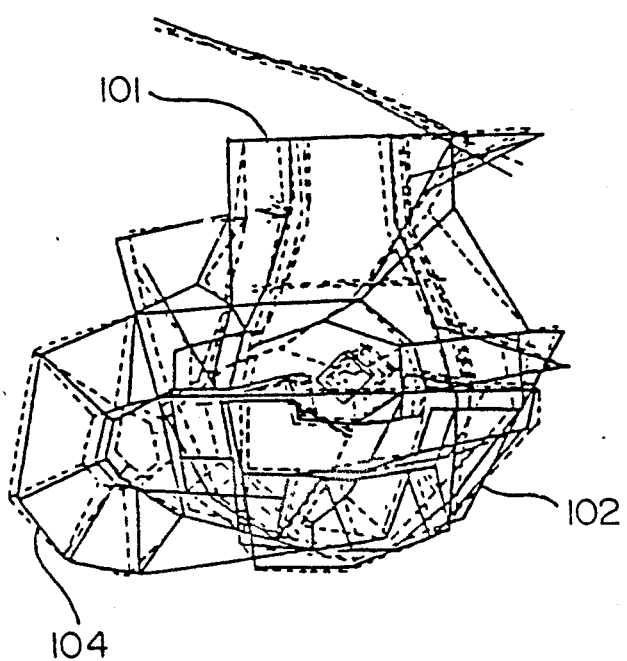
FIG. 14 is a graphic analysis of displacement states of a primary mode of vibration caused in a conventional power unit as it is seen in a side view.
Figure 15:
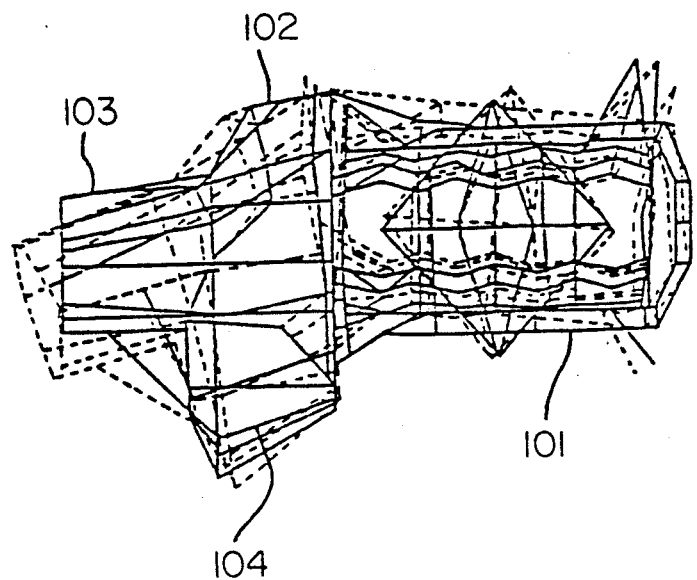
FIG. 15 is a graphic analysis of displacement states of a primary mode of vibration caused in a conventional power unit as it is seen in a front view.

Hereinafter, the result of simulation testing by using a finite element method is explained, with reference to the first embodiment. FIGS. 13 to 15 show the characteristic features of a graphic analysis, which illustrates primary mode vibrations of 237 Hz in a conventional power unit. This power unit consists of a cylinder block 101, a clutch case 102, a gear case 103 and a differential case 104. A solid line represents a stationary condition without vibration. A dotted line represents a maximum displacement state during vibration. As can be seen in FIGS. 13 to 15, the gear case 103 is caused to have a large displacement at an end remote from the cylinder block 101. The clutch case 102 is located so as to act as a fulcrum. Accordingly, the resonance vibration of 237 Hz is characterized as a bending vibration, with the fulcrum located on the plane between the clutch case 102 and the gear case 103.

Figure 16:
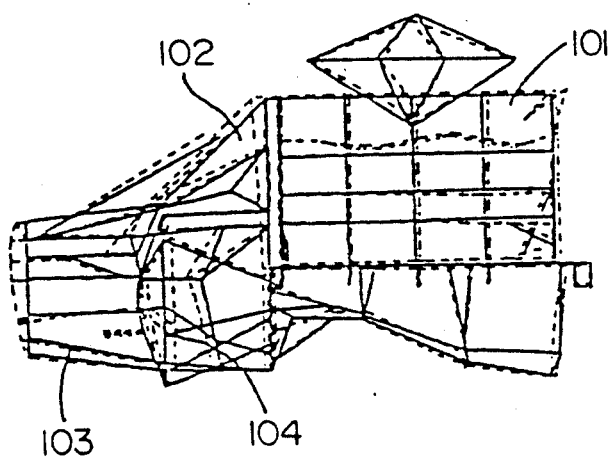
FIG. 16 is a graphic analysis of displacement states of a primary mode of vibration caused in the power unit in accordance with the present invention as it is seen in a plan view.
Figure 17:
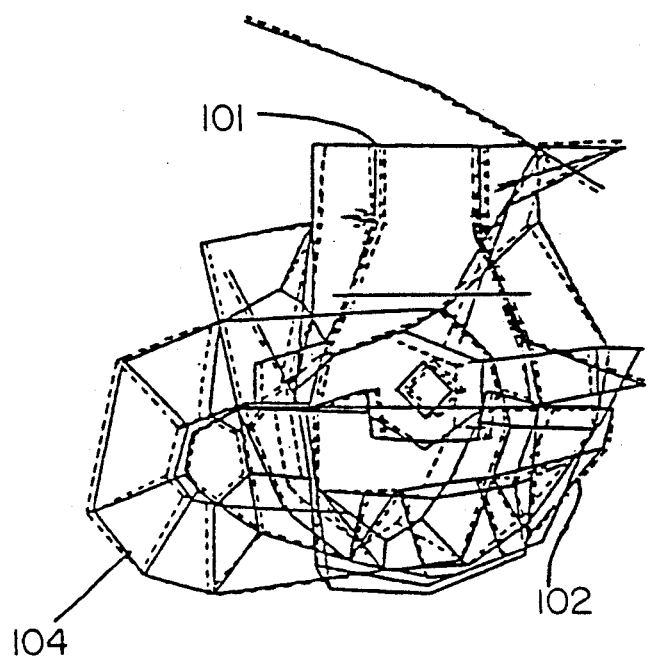
FIG. 17 is a graphic analysis of displacement states of a primary mode of vibration caused in the power unit in accordance with the present invention as it is seen in a side view; and, FIG. 18 is a graphic analysis of displacement states of a primary mode of vibration caused in the power unit in accordance with the present invention as it is seen in a front view.
Figure 18:
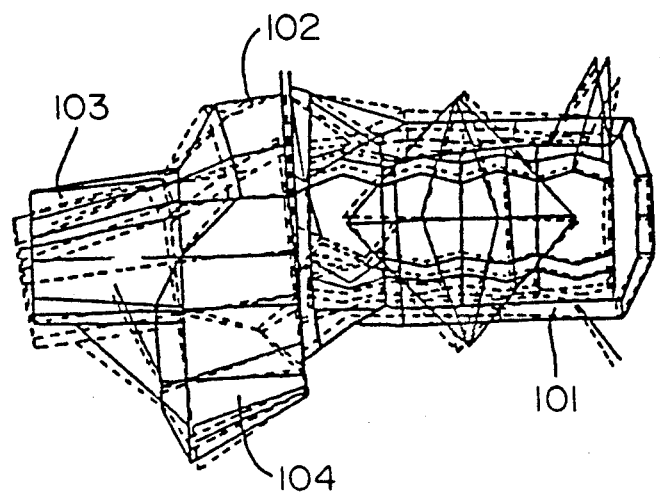

On the other hand, FIGS. 16 to 18 show the characteristic features of a graphic analysis, which illustrates primary mode vibrations in the first embodiment of the present invention. As can be seen from these figures, the gear case 103 undergoes a smaller displacement as compared with the conventional power unit.

Figure 10:
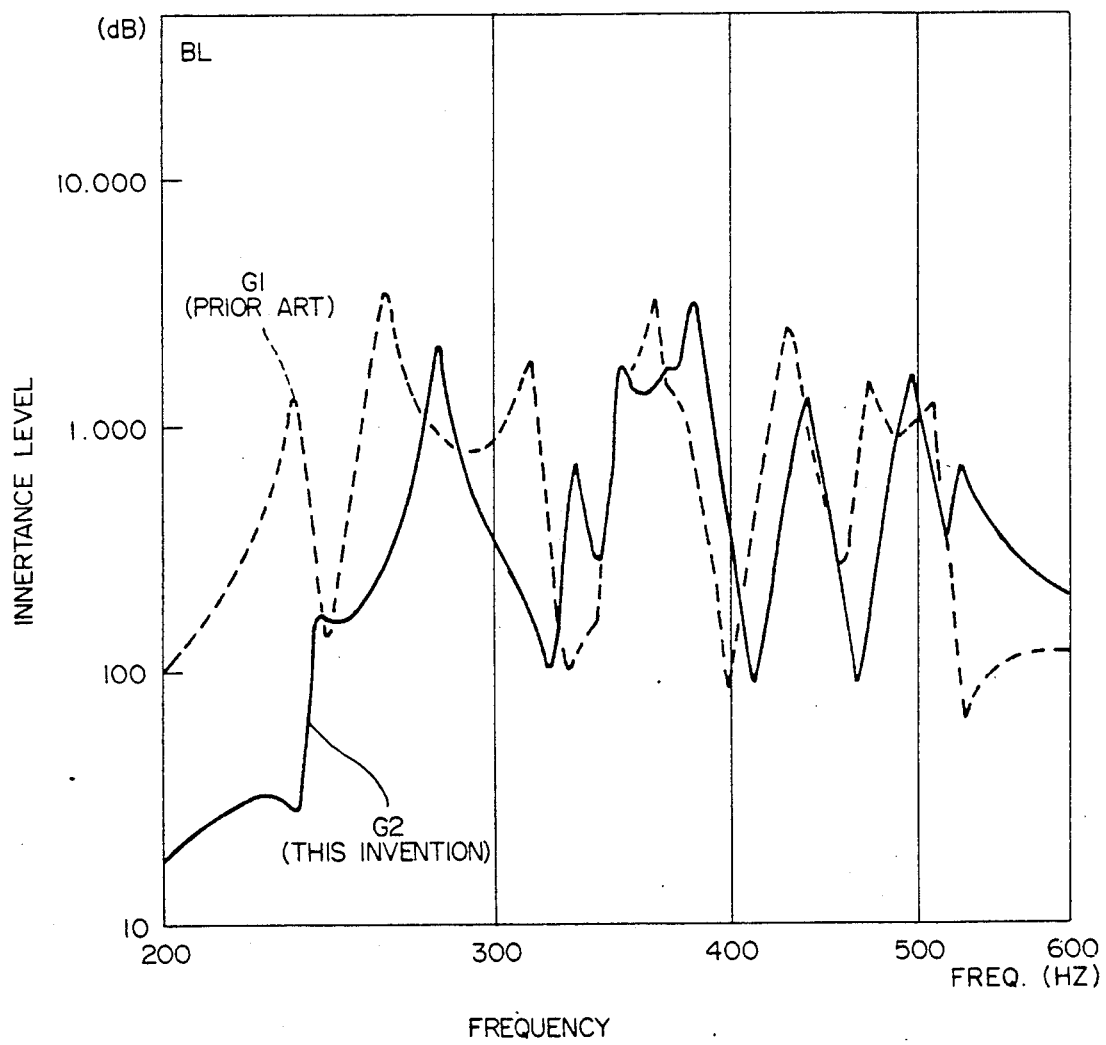
FIG. 10 is a comparison between the present invention and prior art with respect to a peculiar frequency characteristic of inertance level, in a longitudinal direction of the vehicle, detected on a mounting element disposed on the inertia axle of the power unit.
Figure 11:
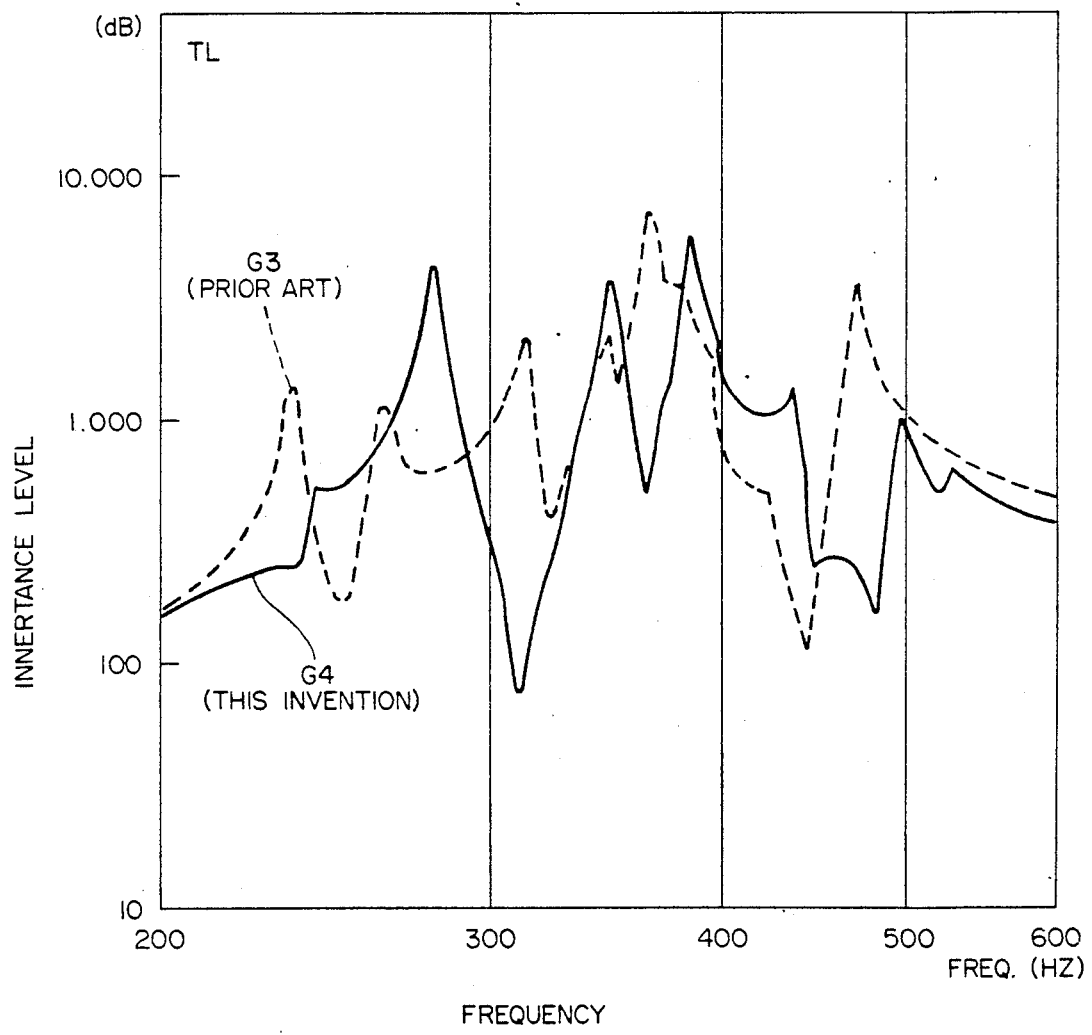
FIG. 11 is a comparison between the present invention and prior art with respect to a peculiar frequency characteristic of inertance level in a transverse direction of the vehicle, detected on the same mounting element used in the detection of FIG. 10.
Figure 12:
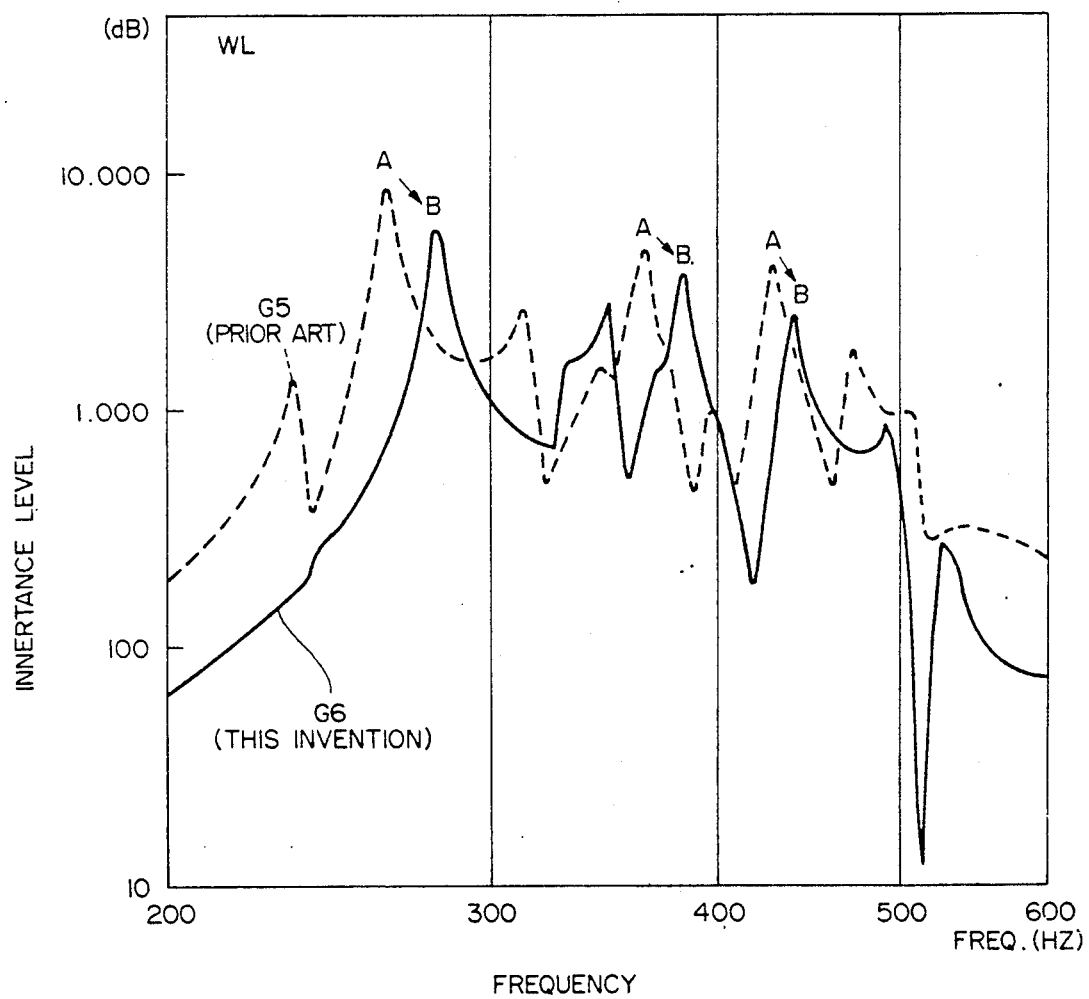
FIG. 12 is a comparison between the present invention and prior art of with respect to a peculiar frequency characteristic of inertance level in a vertical direction of the vehicle, detected on the same mounting element used in the detection of FIG. 10.

In FIGS. 10 to 12, differences between the present invention and the conventional devices are shown by a comparison in the frequency characteristics of the inertance level in the transfer function of vibration caused in the mount 4a of the first embodiment.

As can be seen in FIGS. 10 to 12, the frequency characteristics of the present invention (Lines G2, G4, G6) have higher resonance frequencies as compared to those of the conventional practice (Lines G1, G3, G5). For example, in FIG. 12, peak points A are shifted to peak points B. This shows that the power unit having a structure according to the present invention is increased in its stiffness and in its durability under vibration. Also, the magnitude of the inertance level of the power unit is decreased. Namely, in accordance with the present invention, resonance vibration does not occur until the engine speed reaches a higher speed, and the magnitude of the resonance vibration can be decreased.

The invention may be embodied in other specific forms without departing from the spirit or essential characteristics thereof. The present embodiments are therefore, to be considered in all respects, as illustrative and not restrictive, the scope of the invention being defined by the appended claims rather than by the foregoing description. All changes which come within the meaning and range of equivalency of the claims are, therefore, intended to be embraced therein.

We claim:

1. In combination, a transmission structure for an automotive vehicle and an engine, said transmission structure comprising:
    a first housing connected to the engine, the first housing accommodating a power transmitting device for transferring an output from the engine to a transmission device,
    a second housing for accommodating the transmission device, the second housing being connected to the first housing,
    a differential housing integrally formed with said first housing and positioned so as to be offset from an output shaft of the engine, and
    a reinforcement element having a pair of end portions, one end portion connected to the first housing, another end portion connected to the second housing and being located on the same side as the differential housing with respect to the output shaft of the engine.

2. A transmission structure and engine combination in accordance with claim 1, wherein said first housing and said second housing form at least part of a transmission case, said engine and said transmission case together form a power unit, and the reinforcement element is fixed so that its axis extends parallel to an inertia axis of the power unit.

3. A transmission structure and engine combination in accordance with claim 2, wherein the reinforcement element is fastened at a plurality of fastening means on both the first housing and the second housing.

4. A transmission structure and engine combination in accordance with claim 2, wherein the reinforcement element is fixed to the power unit so that the reinforcement element is bolted at sides of the inertia axis of the power unit.

5. A transmission structure and engine combination in accordance with claim 1, wherein said one end portion has a wider width than the other end portion.

6. A transmission structure and engine combination in accordance with claim 1, wherein the engine is oriented so that said output shaft extends along a transverse direction of a body of the vehicle.

* * * * *